July 19, 1932.  C. C. HOWENSTINE  1,868,167
LUBRICATING MECHANISM
Filed May 25, 1929
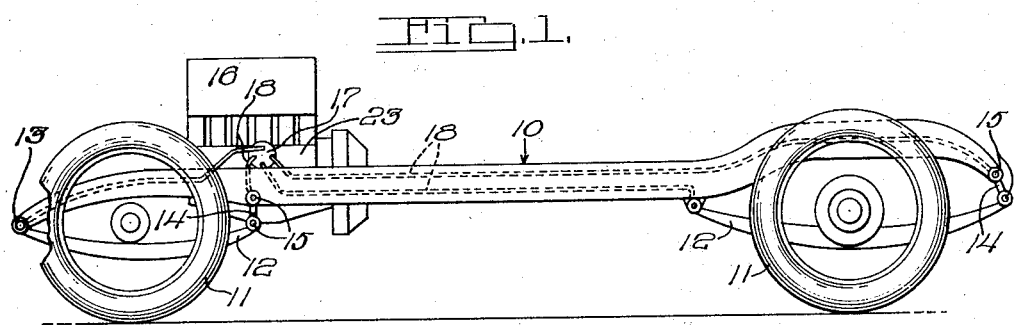
FIG. 1.
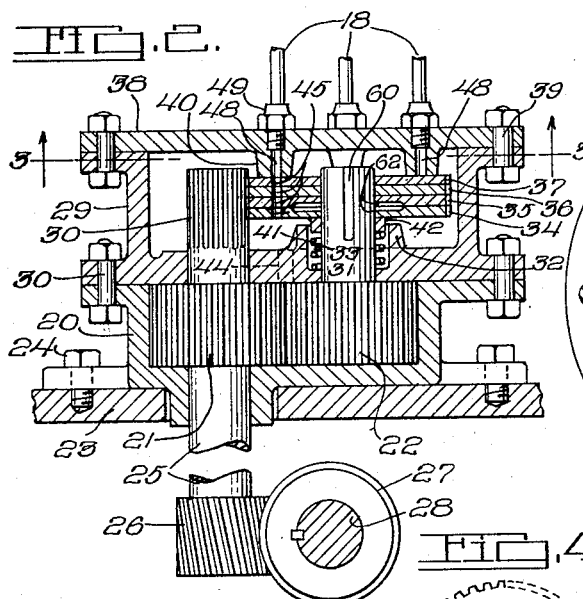
FIG. 2.
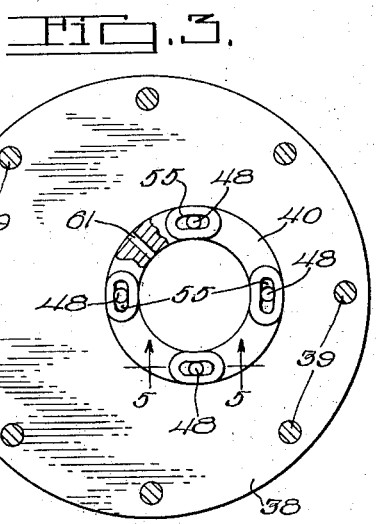
FIG. 3.
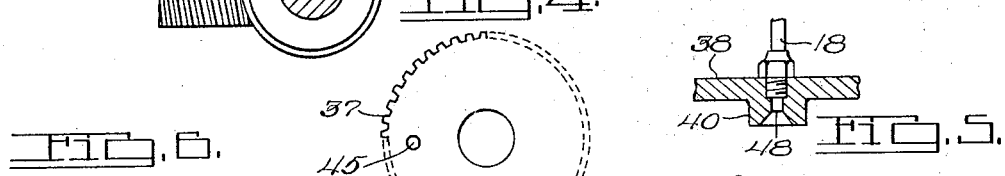
FIG. 4.
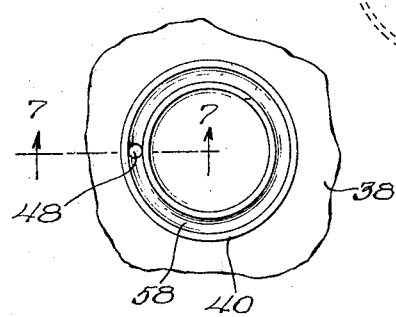
FIG. 6.
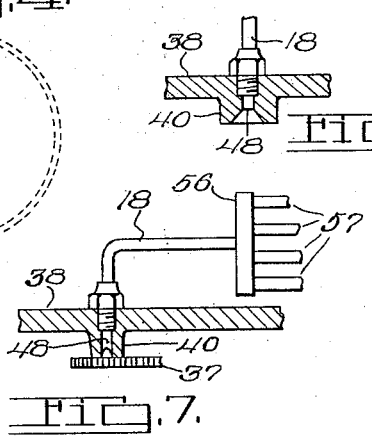
FIG. 5.
FIG. 7.
INVENTOR
Charles C. Howenstine
BY
Harness, Dickey & Pierce
ATTORNEYS.

Patented July 19, 1932

1,868,167

UNITED STATES PATENT OFFICE

CHARLES C. HOWENSTINE, OF DETROIT, MICHIGAN

LUBRICATING MECHANISM

Application filed May 25, 1929. Serial No. 365,805.

This invention relates to lubricating mechanism and particularly to such mechanism as is adapted to intermittently lubricate bearing surfaces, the principal object being the provision of a device of this type by which the bearing surfaces may be automatically supplied with lubricant at relatively infrequent periods of time.

Another object is to provide a device for automatically connecting a bearing surface to a source of lubricant under pressure at relatively infrequent periods of time.

Another object is to provide a device cooperating with the lubricating system of an internal combustion engine of a motor vehicle whereby the pressure side of the engine lubricating system may be intermittently and automatically connected with certain chassis bearings.

Another object is to provide a device for automatically connecting a bearing to a source of lubricant under pressure at relatively infrequent intervals of time, including a plurality of superposed disc-like members each having gear teeth formed thereon and each driven from a common member, the number of teeth on each of the disc-like members varying from the number of teeth on the rest of the disc-like members, and each of the disc-like members being provided with an opening therethrough disposed at an equal distance from their common axis, said disc-like members normally obstructing the flow of lubricant to a passageway leading to each bearing to be lubricated, and said passageway being opened when the openings in all of the disc-like members become simultaneously aligned.

A further object is to provide an oil pump with a casing secured thereto, a pinion being provided in the casing in driving relationship with respect to the oil pump, a plurality of superposed disc-like gears being provided within the casing in meshing relationship with the pinion and each disc-like gears having a different number of teeth than the remainder of the same, whereby the angular velocity of each during rotation will be slightly different from the remainder; one of the disc-like gears cooperating with a track formed in the casing and all of the gears being maintained in contacting relationship, the track being provided with an opening therein leading to a bearing surface to be lubricated and the interior of the casing being connected with the discharge side of the pump, each of the gears being provided with an opening whereby when all of said openings are in alignment and in alignment with the opening in the track, oil from the pump will be led to the bearing to be lubricated.

The above being among the objects of the present invention, the same consists in certain novel features of construction and combinations of parts to be hereinafter described with reference to the accompanying drawing, and then claimed, having the above and other objects in view.

In the accompanying drawing which shows a suitable embodiment of the present invention, and in which like numerals refer to like parts throughout the several different views;

Fig. 1 is a more or less diagrammatic side elevation of a motor vehicle chassis.

Fig. 2 is a sectional view taken through the center of the oil pump shown mounted on the motor in Fig. 1.

Fig. 3 is a view taken on the line 3—3 of Fig. 2.

Fig. 4 is a plan view of one of the disc-like gears shown in section in the pump in Fig. 2.

Fig. 5 is a fragmentary sectional view taken on the line 5—5 of Fig. 3.

Fig. 6 is a fragmentary view of the under face of the cover shown in Fig. 2, showing the manner of forming the track thereon when a single oil lead is employed to the chassis bearings.

Fig. 7 is a fragmentary view taken as on the line 7—7 of Fig. 6, and showing the fragment of one of the gear members cooperating therewith.

Considerable attention has been directed in the last few years to improving methods in the lubricating of the chassis bearings of motor vehicles. Most of these attempts have taken the form of providing a single means for simultaneously distributing a supply of lubricant to substantially all of the chassis bearings, and most of these in turn, have been of the type in which an independent oil supply has been provided for the chassis lubricating system. This, of course, necessitates maintaining two independent lubricant reservoirs. Incidentally, this last class of device has also been limited to manually or foot operated devices. I am also aware that attempts have been made to connect the engine lubricating system with the chassis lubricating system whereby the pressure supplied by the engine during operation, and the oil used for lubricating the engine, may be employed for lubricating the chassis bearings. I am also aware that at least one attempt has been made whereby the chassis lubricating system has been automatically connected to the engine lubricating system, and it is to this last class of devices that the present invention is particularly applicable. The construction heretofore proposed involved a train of gears of such size and construction as to prohibit its use commercially because of excessive cost, and furthermore involved so many wearing surfaces as to make it impractical for this reason, if no other. Furthermore, the construction was such that unless the gear train was carried out to an extent totally out of proportion to the benefits derived, the engine lubricating system and the chassis lubricating system would be connected at so frequent intervals as to cause an over-lubrication of the chassis bearings and a waste of the engine lubricating oil.

By the present invention an extremely simple and economical construction is provided whereby the engine lubricating system and the chassis lubricating system may be automatically connected together at relatively infrequent intervals, and which intervals may be varied within relatively wide limits at very little cost. Furthermore, by my construction, a device is provided in which very little wear is liable to occur, and in which the device may be assured a length of life, without servicing, equal to that of the motor vehicle engine itself.

Referring to the drawing, and particularly to Fig. 1, I show, in order to illustrate one application of the present invention, a motor vehicle chassis comprising a frame 10 having wheels 11 connected thereto through the usual springs 12 which are connected at their front end to the frame through the usual spring bolt 13, and at their rear ends through the usual shackles 14 and bolts 15. The chassis is provided with an internal combustion engine 16 upon which in turn is mounted a suitable embodiment of the present invention, indicated generally in Fig. 1 as 17, and from which a plurality of tubes 18 extend to the various bolts 13 and 15, for the purpose of conducting lubricant to the wearing surfaces thereof. The device indicated generally as 17 is preferably constructed as a unitary part of the oil pump conventionally employed for supplying oil to the various wearing surfaces of the engine, and may take the form illustrated in the remaining figures.

Referring particularly to Fig. 2, a conventional type of oil pump is shown which comprises a housing 20 in which are provided two inter-meshing gears 21 and 22 respectively, co-acting to form the conventional type of gear pump. The casing 20 is shown as being secured to the side of the crank case 23 of the engine 16 by bolts such as 24. Non-rotatably secured to the gear 21 is the drive shaft 25 which may project inwardly into the crank case 23 and at its inner end carry a gear 26 meshing with a gear 27 secured to the cam shaft 28 of the engine, so as to receive driving movement therefrom. The casing 20 is, of course, provided with a suitable inlet and outlet (not shown), as in conventional constructions. Instead of the usual cap for the casing 20, the open side thereof is closed by a second casing 29 secured thereto by bolts such as 30, or other suitable means. Projecting up into the interior of the casing 29 and preferably formed either as an integral part of the gear 21 or of the shaft 25, is a pinion 30. The shaft 31 for the gear 22 has bearing in the lower wall of the casing 29 and also projects up into the interior of the casing 29, the bottom wall of the casing being bossed therearound as at 32, and the bore of the boss being enlarged as at 33. Rotatably received on the shaft 31 is a plurality of superposed contacting disc-like gear members 34, 35, 36 and 37 which lie in meshing relationship with the pinion 30. The casing 29 is provided with a cover 38 secured thereto by means of bolts such as 39, or other suitable means. Formed on the under face of the cover 38 is an annular track 40 concentric with the shaft 31, and against which the upper disc 37 is constantly urged by means of a coil spring 41 held under compression in the enlarged portion 33 of the boss 32, and the washer 42 bearing against the lower face of the lower gear member 34. An opening 44 is provided in the lower wall of the casing 29 and connects the interior of the casing 29 with the discharge or pressure side of the oil pump so that the interior of the casing 29 is maintained under the same pressure as the discharge pressure of the oil pump. Each of the gear members 34, 35, 36 and 37 is provided with an opening 45 therein, the openings 45 all being an equal distance from the axis of rotation of the gear members 34 to 37 inclusive so that when all of them are brought into alignment they form a continuous passage through the gear members 34 to 37 inclusive axially of the same. The openings 45 are furthermore at such a distance from the axis of rotation of the gear members that they are in vertical alignment at all times with the lower surface of the track 40 on the cover 38. The cover 38 is provided therein with one or more openings 48 extending through the same in alignment with the track 40 and at the same distance from the axis of the track 40 as the openings 45 from the axis of the gears 34 to 37 inclusive. It will be apparent that when the openings 45 are in alignment with each other and with one of the openings 48, the pressure of the oil in the casing 29 will be transmitted to such opening 48. These openings 48 are connected through connections such as 49 to the various tubes 18 which extend to the bearing surfaces previously described in connection with the bolts 13 and 15, so that upon the alignment of the openings 45 and 48 above described, the oil under pressure from the chamber 29 is transmitted through the tubes 18 to the bearing surfaces.

Each of the gears 34, 35, 36 and 37 has a different number of teeth thereon. It is well understood that these gears may have a similar but each a slightly different number of teeth, and still all properly mesh with the pinion such as 30 having a constant number of teeth. The result of this construction is that each one of the gears 34, 35, 36 and 37 is driven at a slightly different speed, with the result that the openings 45 will be aligned or at least will overlap each other only at relatively infrequent time intervals. As a way of illustration, let it be considered that the gear 34 has forty-nine teeth, the gear 35 has fifty teeth, the gear 36 has fifty-one teeth, and the gear 37 has fifty-two teeth. It may also be considered that the pinion 30 has twelve teeth. Recognizing that when the openings 45 are once in alignment, to bring them again into alignment by constantly turning the pinion 30 in one direction, the pinion 30 must turn a number of revolutions equal to the product of the number of teeth on the gears 34, 35, 36 and 37 divided by the number of teeth in the pinion 30, we find that the pinion 30, under the assumption made, must turn 541,450 revolutions. Assuming the cam shaft 28 as running half-engine speed, and assuming that the engine is turning 1000 r. p. ms. at a vehicle speed of thirty miles an hour, we find that the time between full alignment of the openings 45 would be 1080 minutes, in which time the vehicle would have travelled approximately 540 miles. Regardless of the speed of the vehicle, it will be apparent that an automatic lubrication of the chassis bearings fed by the tubes 18 will occur every 540 miles. This interval of travel between periods of lubrication may obviously be varied by varying the number of disc-like gears, the number of teeth which each is provided with, or the relative diameter and number of teeth on the pinion 30. The proportions assumed above are considered to be acceptable for ordinary use.

The length of time which the lubricating oil is being supplied under pressure to the various chassis bearings may be controlled by varying the size of the openings 45. It may also be controlled by varying the size of the openings 48 on the face of the track 40. I prefer to elongate the lower ends of the openings 48 in the direction of the track 40, as indicated at 55 in Fig. 3, where more than one opening 48 is employed. It is preferable, in some cases, to provide one opening 48 for each tube 18, as illustrated in Figs. 2 and 3, but in some cases it may be preferred to employ but a single supply line, such as a single tube 18 as illustrated in Fig. 7, and which connects with one or more headers 56 from which individual tubes such as 57 may extend to the various bearings. Where a single opening 48 is employed, as in Fig. 7, I prefer to form a continuous groove such as 58 in the lower face of the track 40, as illustrated in Fig. 6, thereby providing a longer period of time for the flow of oil into the tube 18 than would otherwise be possible, this being desirable in view of the fact that a greater flow of oil will be necessary through the single opening 48 in this case, to take care of all of the bearings.

If the openings 45 are of the same diameter and each diameter approximately equal to the circular pitch of the gears, and each gear varies from its adjacent gear as to the total number of teeth by one, it will be apparent that from the moment two of the openings 45 begin to overlap it will require approximately one complete revolution of the gears to bring their openings 45 into complete alignment, and will require approximately one complete revolution to again move them out of complete alignment. In such case, it will be apparent that the openings 45 when they are once sufficiently aligned to permit the flow of oil through them to the openings 48, will deliver oil to the openings 48 during two complete revolutions of the gears, assuming the openings 45 are approximately equal to the circular pitch of the gears. From this it will be apparent that by changing the size of the openings 45, a greater or lesser amount of oil may be transmitted to the openings 48 during the infrequent time intervals that all of the openings 45 are in partial or full alignment.

With the construction thus far described, it will be apparent that the pressure of the oil within the housing 29 acts over approximately the full area of the lower gear 34 to maintain it against the lower face of the track 40 and prevent possible leakage of oil into the openings 48. Consequently, the spring 41 need only be of sufficient strength to hold the upper disc 37 in contact with the track 40. I find that this amount of pressure is not necessary for the suitable operation of the device, and may foster greater wear than is desirable. Consequently, I provide means for permitting the oil under pressure within the casing 29 to be exerted upon the upper disc 37 within the confines of the track 40 so as to partially balance the pressure of the oil acting to force the disc against the track 40. This means may take the form of a groove such as 60 in the shaft 31, or may be provided as indicated in Fig. 3, by drilling an opening 61 laterally through the track 40. In some cases it may be desirable to relieve the adjacent faces of the gears 34 to 37 adjacent their centers, as indicated in the gears 34 and 35 at 62, in Fig. 2, to effect a more perfect sealing contact between them.

From the above it will be apparent that the construction herein provided offers an extremely simple and economical construction whereby oil under pressure may be fed to bearings at relatively infrequent intervals, and that the time interval between the application of oil to the bearings may be easily, simply and economically varied to meet any conditions. It will also be apparent that by this construction the relative amount of oil which may be fed to the bearings at infrequent intervals may be easily and simply controlled.

It will also be apparent that the construction herein provided will have a relatively small amount of wear as all of the parts are constantly immersed in oil under pressure. Furthermore, the relative rates of rotation between the gears 34—37 which bear against each other are so close to each other that the wear between these gears will be substantially negligible.

Although I have shown the present invention as incorporated as a unitary part of the usual lubricating pump provided in connection with internal combustion engines, it is obvious that it may be made and driven separately from the pump and simply connected by a tube or other oil lead to the pump, so as to effect the same result as herein described.

It will also be apparent that although I have described the present invention in connection with a motor vehicle for the purpose of lubricating the chassis bearings, and as connected with the constantly operating lubricating system of the vehicle, the device may equally well be applied to industrial machinery for lubricating the bearing surfaces thereof, in which case the pump itself may be constantly operated, but will be effective for lubrication only when the openings in the disc-like gears are in full or partial alignment so as to permit the passage of oil through them.

Formal changes may be made in the specific embodiment of the invention described without departing from the spirit or substance of the broad invention, the scope of which is commensurate with the appended claims.

What I claim is:

1. In combination, a casing having an inlet and an outlet, a plurality of superposed cooperating rotatable discs in said casing one of which overlies said outlet, each of said discs having an opening therein, the path of travel of said openings intersecting the axial line of said outlet, and a common means directly engaging at least two of said discs for driving them at unequal rates of rotation.

2. In combination, a casing having an inlet and an outlet, a plurality of contacting overlapping rotatable discs in said casing, each of said discs having an opening therein, the path of travel of said openings intersecting the axial line of said outlet, one of said discs being in sealing relation with respect to said outlet, and means common to and directly engaging at least two of said discs for driving them each at a different rate of rotation.

3. In combination, a casing having an inlet and an outlet, a plurality of superposed contacting rotatable members in said casing, one of said members being in sealing relation with respect to said outlet, each of said discs being provided with an opening therethrough eccentric to its axis of rotation and having a path of travel intersecting the axis of said outlet, and a single means for rotating said discs each at a different rate of rotation.

4. In combination, a casing having an inlet and an outlet, a rotatable disc overlying said outlet and normally sealing the same, said disc having an opening therein adapted to be brought into alignment with said outlet once during each revolution of said disc, a second rotatable disc normally sealing the opening in the first mentioned disc, said second disc having an opening therein alignable with the opening in the first mentioned disc and means mounted on a single shaft directly engaging said discs for driving said discs each at a different rate of rotation.

5. In combination, a casing having an inlet and an outlet, a rotatable disc overlying said outlet and normally sealing the same, said disc having an opening therein adapted to be brought into alignment with said outlet once during each revolution of said disc, a second rotatable disc concentric with the first mentioned disc and contacting thereagainst, said second disc normally sealing the opening in the first mentioned disc and itself being provided with an opening therethrough alignable with the opening in the first mentioned disc, and a single gear means for driving said discs each at a different rate of rotation.

6. In combination, a casing having an inlet and an outlet, a rotatable disc overlying said outlet and normally sealing the same, said disc having an opening therein adapted to be brought into alignment with said outlet once during each revolution of said disc, a second rotatable disc concentric with the first mentioned disc and contacting thereagainst, said second disc normally sealing the opening in the first mentioned disc and itself being provided with an opening therethrough alignable with the opening in the first mentioned disc, means for driving said discs each at a different rate of rotation, and means constantly urging said discs together and the first mentioned disc into sealing relation with respect to said outlet.

7. In combination, a casing having an inlet and an outlet, a pair of overlapping disc-like gear members in said casing one of which lies in sealing relation with respect to said outlet and is provided with an opening therethrough alignable with said outlet, the other of said gears normally sealing the opening in the first mentioned gear when said opening is in alignment with said outlet, said other of said gears having an opening therethrough alignable with the opening in said first mentioned gear, and a pinion engaging said gears and driving said gears each at a different rate of rotation.

8. In combination, a casing having an inlet passage and an outlet passage, a plurality of superposed contacting concentric rotatable discs disposed between said inlet and said outlet and normally sealing them from each other, each of said discs being provided with an opening therethrough and all of said openings being of equal distance from the center of rotation of said discs and alignable with one of said passages, and means common to all of said discs for simultaneously rotating said discs each at a different rate of rotation.

9. In combination, a casing having an inlet passage and an outlet passage, a plurality of superposed contacting concentric rotatable discs disposed between said inlet and said outlet and normally sealing them from each other, each of said discs being provided with an opening therethrough and all of said openings being of equal distance from the center of rotation of said discs and alignable with one of said passages, each of said discs having a different number of gear teeth formed on its periphery, and a pinion having a uniform number of teeth engageable with said discs for driving them.

10. In combination, a casing having an inlet and an outlet, a track formed on the interior of said casing and upon which said outlet opens, a rotatable disc resting against said track and being provided with an opening alignable with said outlet, means for normally sealing said opening when in alignment with said outlet comprising a plurality of contacting like rotatable disc members one of which bears against the first mentioned disc, each of the last mentioned disc members having an opening therein alignable with each other and with said outlet, a shaft extending into said casing in axially parallel relation with respect to said discs and means on said shaft for driving said discs each at a different rate of rotation.

11. In combination, a pump including a casing and a rotatable pump element therein, a second casing secured to said pump casing and interiorly connected to the discharge side thereof, an outlet for said second casing, a plurality of co-operating rotatable means within said second casing normally sealing said outlet and adapted to intermittently uncover it, and a single driving connection between said pump and said rotatable means adapted to drive at least two of said means at rates of speed different from each other.

12. In combination, an oil pump including a casing and a rotatable pump element therein, a second casing secured to said pump casing and being interiorly connected with the discharge side of said pump, an outlet for said second casing, a plurality of gear members in said second casing normally sealing said outlet and adapted to intermittently uncover it, and a pinion having direct driving connection with said rotatable pump element in mesh with said gear members for driving them at rates of speed different from each other.

13. In combination, an oil pump comprising a casing and a pair of gears, a second casing secured to said casing and being interiorly connected with the discharge side of said pump, an outlet for said second casing, a plurality of cooperating gear members normally sealing said outlet, and a pinion in said second casing concentric with and rotatable in direct accordance with one of said gears and engaging all of said gear members, said gear members each having an opening therein adapted to be intermittently aligned with each other and with said outlet.

14. In combination, an oil pump comprising a casing and a pair of gears, a second casing secured to said casing and being in communication with the discharge side of said pump, an outlet for said second casing, a pinion concentric with one of said gears and rotating in direct accordance therewith extending into said second casing, a shaft for the other of said gears projecting into said casing, a pluralty of gear members rotatably mounted on said shaft within said second casing and each lying in meshing relationship with respect to said pinion, one of said gear members normally sealing said outlet and being provided with an opening therethrough alignable with said outlet, and the remainder of said gear members normally sealing the opening of the first mentioned gear member and each provided with an opening alignable with said opening in the first mentioned gear member.

15. In combination with a lubrication pump adapted for continuous circulation of a bearing system and having an inlet and an outlet for said system, a casing, a shaft drivingly connected with said pump extending into said casing, an outlet in said casing, a plurality of overlapping rotatable discs in said casings normally closing said casing outlet, said discs each having an opening therein alignable with said casing outlet and with each other, means drivingly connecting said shaft and said discs for unequal rotational speeds of said discs, whereby to intermittently uncover said casing outlet and means acting independently of said continuous circulation system connecting the discharge side of said pump with said casing.

16. In combination, a casing having an inlet and an outlet, a plurality of superposed co-operating rotatable discs in said casing, one of which overlies said outlet, each of said discs having an opening therein, the path of travel of said openings intersecting the axial line of said outlet, means for driving said discs at unequal rates of rotation, and resilient means constantly urging said discs into contact with each other.

17. In combination, a casing having an inlet and an outlet, a plurality of superposed co-operating rotatable discs in said casing one of which overlies said outlet, each of said discs having an opening therein, the path of travel of said openings intersecting the axial line of said outlet, and means for driving said discs at unequal rates of rotation, said outlet being elongated in the direction of the path of travel of the opening in that one of said discs next adjacent thereto.

18. In combination, a casing element having an outlet opening in a planular face thereof, a rotatable disc element overlapping said face and having an opening therein whose path of travel intersects said outlet opening, one of said openings communicating with an annular groove located in the corresponding of said elements and approximately coinciding with said path of travel, another rotatable disc overlapping the first mentioned disc and having an opening therein whose path intersects the axial line of said outlet opening, and means for driving said discs at different rates of rotation.

CHARLES C. HOWENSTINE.